(12) United States Patent
Minnear et al.

(10) Patent No.: US 7,576,970 B2
(45) Date of Patent: Aug. 18, 2009

(54) SYSTEM AND METHOD FOR STORING HYDROGEN AND ELECTRICAL ENERGY

(75) Inventors: William Paul Minnear, Clifton Park, NY (US); Luke Nathaniel Brewer, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 1289 days.

(21) Appl. No.: 10/745,354

(22) Filed: Dec. 24, 2003

(65) Prior Publication Data

US 2005/0146836 A1    Jul. 7, 2005

(51) Int. Cl.
    *H01G 9/00*    (2006.01)
(52) U.S. Cl. .................. 361/502; 361/503; 361/504; 361/512; 361/303; 361/305; 429/33; 429/40; 429/41
(58) Field of Classification Search .......... 361/502, 361/503–504, 508–512; 329/137, 138; 439/33, 439/40, 41
    See application file for complete search history.

(56) References Cited

U.S. PATENT DOCUMENTS

| | | | | |
|---|---|---|---|---|
| 4,088,551 A | * | 5/1978 | Raetzch et al. | ............... 205/616 |
| 4,620,914 A | * | 11/1986 | Abens et al. | ................. 204/265 |
| 5,405,513 A | * | 4/1995 | Lewis et al. | ............... 205/775.5 |
| 5,491,361 A | | 2/1996 | Stupian et al. | |
| 5,543,364 A | | 8/1996 | Stupian et al. | |
| 6,475,664 B1 | * | 11/2002 | Kawakami et al. | ............ 429/137 |
| 6,783,891 B2 | * | 8/2004 | Ovshinsky et al. | ........ 429/218.1 |
| 6,794,080 B2 | * | 9/2004 | Sennoun et al. | ................. 429/40 |
| 6,824,908 B2 | * | 11/2004 | Yamaura et al. | ............... 429/33 |
| 7,199,997 B1 | * | 4/2007 | Lipka et al. | .................. 361/502 |
| 7,273,597 B2 | * | 9/2007 | Takeuchi et al. | ......... 423/445 R |

OTHER PUBLICATIONS

W. Zhu, et al, "Amorphous ferroelectric $(Ba_{0.67}Sr_{0.33})Ti_{1.02}O_3$ thin films with enhanced $H_2$ induced interfacial polarization potential" Nov. 1, 1998, Journal of Applied Physics, vol. 84, No. 9, pp. 5134-5139.

(Continued)

*Primary Examiner*—Nguyen T Ha
(74) *Attorney, Agent, or Firm*—Patrick K. Patnode

(57) ABSTRACT

A hybrid capacitive storage system and method for storing electrical energy and hydrogen comprising at least a first dielectric layer, which dielectric layer is substantially impermeable to hydrogen. The hybrid storage system further comprises at least a first catalytic electrode layer disposed on at least a portion of a first surface of said first dielectric layer, which first catalytic electrode layer converts molecular hydrogen into atomic hydrogen, an electrode layer disposed on at least a portion of a second surface of said first dielectric layer, which electrode layer is selectively electrically connected to said first catalytic electrode layer; and at least one field generator for selectively applying a field to said storage system. Upon introduction of hydrogen to the storage system and activation of the at least one field generator, the hydrogen is converted to protons and electrons, wherein the electrons are permitted to flow through electrical connection to the electrode layer and the protons remain at the first catalytic electrode layer.

26 Claims, 3 Drawing Sheets

OTHER PUBLICATIONS

J. Deng, et al, "Amorphous $Pb(Zr, Ti)O_3$, thin film hydrogen gas sensor", 2001, Sensors and Actuators B77, pp. 416-420.

W. Zhu, et al, Preparation, Property and Mechanism studies of amorphous ferroelectric $(Ba,Sr)TiO3$ thin films for novel metal-ferroelectric-metal type hydrogen gas sensors, Jun. 2000, Journal of Material Research Society, vol. 15, No. 6, pp. 1291-1302.

* cited by examiner

SYSTEM AND METHOD FOR STORING HYDROGEN AND ELECTRICAL ENERGY

BACKGROUND OF INVENTION

The present invention relates generally to field-assisted gas storage systems. More specifically, the present invention relates to field-assisted hybrid hydrogen storage system, wherein hydrogen and electrical energy are stored in the form of protons and electrons.

Hydrogen is considered to be an ideal fuel for fuel cell vehicles. Typically, hydrogen fuel cells operate by converting the chemical energy in hydrogen and oxygen into water, producing electricity and heat, which electricity is then fed into an electric motor that powers the wheels of a fuel cell vehicle.

Hydrogen is the most plentiful element in the universe, is the third most plentiful element on Earth, can be derived from multiple renewable energies, and, when consumed as fuel in a fuel cell, produces only water without the production of greenhouse gases such as carbon dioxide. Conventional means of storing hydrogen for end use delivery include: (1) liquid or gaseous hydrogen, (2) hydrocarbon fuels (i.e., fossil fuels), and (3) solid materials (i.e., metal hydrides).

Using liquid or gaseous hydrogen as the energy source in a fuel cell is not ideal. Hydrogen is highly flammable and requires a low hydrogen-to-air concentration for combustion. Furthermore, hydrogen is harder to transport and store than other liquid fuels. Additionally, there is currently only a very limited infrastructure available for distributing hydrogen to the public.

Hydrogen storage materials that chemically store the hydrogen fuel are considered to be an advantageous source of hydrogen for fuel cells and in a wide range of potential applications. However, getting sufficient hydrogen solubility, storage density, and mobility in such materials has proven to be difficult. Furthermore, the ability to control the rates of hydrogen uptake and release over a broad range of power output for applications such as fuel cells has not yet been achieved. Therefore, improved hydrogen storage materials are desired for a variety of applications, including selective hydrogen separation from other gases, catalysis, and fuel cells for vehicles, personal power generation, and stationary power generation.

Extensive research activity in the past 30 or so years has focused on storing hydrogen in the form of solid metal hydrides. Metal hydrides are typically generated exothermically when metals and alloys are exposed to hydrogen. Most of the hydrogen reacts with these metals or alloys and forms new compounds, while a smaller portion of the hydrogen decomposes into atomic hydrogen in the exothermic reaction and subsequently enters interstices in the metal lattice. The hydrogen can be recovered for use by heating, by electrolytic oxidation of the hydride, or by a reaction with an oxide or water. One advantage of using a metal hydride for hydrogen storage is that the volume density for hydrogen storage in metal hydrides is relatively large in comparison to other storage media. However, recovering the hydrogen from the hydride is difficult, as is regenerating the metal. Moreover, the metal adds significant weight to the fuel cell system.

Examples of well-known hydrogen storage materials include metal hydrides, such as $FeTiH_2$ and $LaNi_5H_6$, which hydrides release hydrogen upon heating. Even though $FeTiH_2$ and $LaNi_5H_6$ have acceptable recovery temperatures, the hydrogen content in terms of weight percent is too low for use in vehicular fuel cell applications. Other metal hydrides, such as $MgH_2$ and $TiH_2$, have higher hydrogen contents, about 7.6 and about 4.0 percent by weight respectively, but must be heated to high temperatures (i.e., above about 100° C.) in order to recover the hydrogen. Other drawbacks to the use of metal hydrides as gas storage materials include disproportionation, poisoning, accompanying losses of capacity, and the need for regeneration of some of the storage alloys.

Carbon nanotubes are another potential hydrogen storage material that have been studied extensively. Carbon nanotubes are fullerene-related structures that consist of seamless graphite cylinders closed at either end with caps containing pentagonal rings. Carbon nanotube powders tend to pack inefficiently and have poor volumetric efficiency. Furthermore, carbon nanotubes are very expensive to produce, and currently are not available in the quantities that are needed for commercial hydrogen storage applications.

The future hydrogen economy requires efficient ways to store and transport hydrogen for automobile and distributed power fuel cell applications, and numerous other applications. Several methods have been proposed for hydrogen storage, including those discussed above, but currently, none of the materials or methods has demonstrated the desired hydrogen storage density, hydrogen mobility, and/or hydrogen uptake/release capability needed for commercial applications.

Therefore, it would be desirable to have gas storage materials that are light, compact, relatively inexpensive, safe, and easy to use. It would be further desirable to have gas storage materials that provide capability of storing and releasing hydrogen at atmospheric temperature and pressure. It would also be desirable to have such materials comprise a mechanism that allows the charging/uptake and releasing of gas to be well controlled.

BRIEF DESCRIPTION

A hybrid capacitive storage system and method for storing electrical energy and hydrogen is provided. The hybrid storage system includes at least a first dielectric layer substantially impermeable to hydrogen. The hybrid storage system further includes at least a first catalytic electrode layer disposed on at least a portion of a first surface of said first dielectric layer, an electrode layer disposed on at least a portion of a second surface of said first dielectric layer, and at least one field generator for selectively applying a field to the storage system. The first catalytic electrode layer converts molecular hydrogen into atomic hydrogen and the electrode layer is selectively electrically connected to the first catalytic electrode layer. Upon introduction of hydrogen to the storage system and activation of the at least one field generator, the hydrogen is converted to protons and electrons, wherein the electrons are permitted to flow through electrical connection to the electrode layer and the protons remain at the first catalytic electrode layer.

In one aspect, a method for storing electrical energy and hydrogen comprises introducing molecular hydrogen to at least a first dielectric layer, which dielectric layer is substantially impermeable to hydrogen, converting molecular hydrogen into atomic hydrogen, and selectively applying a field to convert the atomic hydrogen to protons and electrons.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
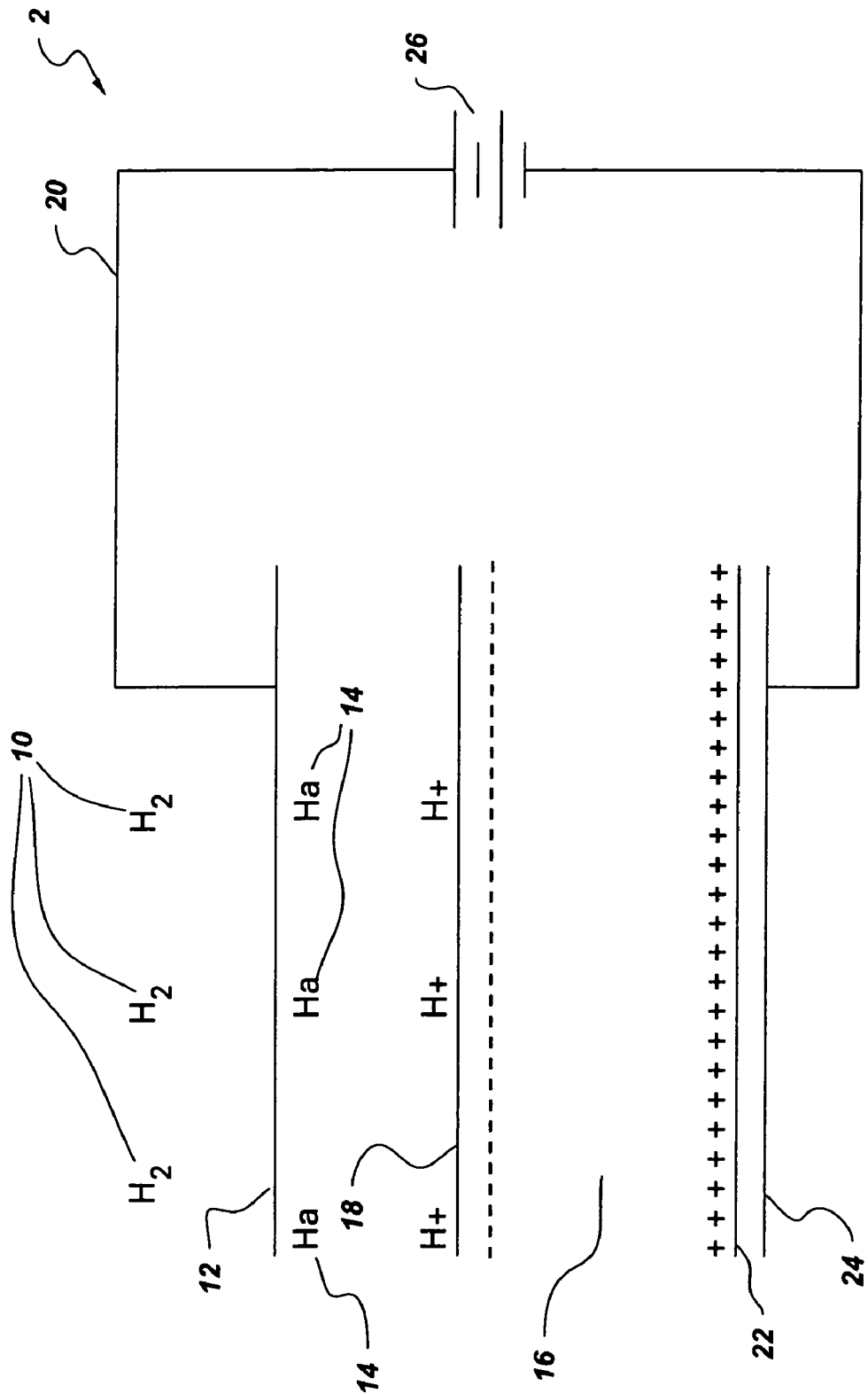
FIG. 1 is a diagram of an exemplary embodiment of a hybrid capacitive storage system showing the dissociation of molecular hydrogen into atomic hydrogen and the storage of protons and electrons.

FIG. 1 schematically illustrates an exemplary hybrid capacitive storage system 2 for storing hydrogen and electrical energy. The hybrid capacitive system comprises a first dielectric layer 16 comprising a dielectric material. The dielectric layer 16 is comprised of a first surface 18 and a second surface 22. At least one catalytic electrode layer 12 is disposed on at least a portion of the first surface 18 of the first dielectric layer 16. The catalytic electrode layer 12 is electrically connected to a second electrode layer 24, which electrode layer 24 is disposed on at least a portion of the second surface 22 of the dielectric layer 16. An electrical connection 20 connects the first catalytic electrode layer 12 and the second electrode layer 24. The hybrid capacitive storage system 2 further comprises a field 26 that may be applied between the first catalytic electrode layer 12 and the second electrode layer 24.

Molecular hydrogen 10 is introduced to the catalytic electrode layer 12, which catalytic electrode layer 12 catalytically splits molecular hydrogen 10 to atomic hydrogen 14. In the catalytic splitting, each hydrogen molecule is converted to two hydrogen atoms. The atomic hydrogen 14 dissolves into the first catalytic electrode layer 12. Under the action of the field 26 the atomic hydrogen 14 is ionized, thereby forming protons and electrons. The protons are hydrogen nuclei that migrate through the catalytic electrode layer 12 to the first surface 18 of the dielectric layer 16. The electrons are transported through the electrical connection 20 to the second electrode layer 24.

The electrical field 26 may be selectively applied to allow the electrons to flow to the second electrode layer 24. Once the electrical connection is opened and the field is taken off, the electrical energy and the chemical energy in form of hydrogen are stored in the hybrid capacitive storage system 2. When the stored hydrogen needs to be released, the electrical connection is reestablished and the electrons are permitted to flow back through the electrical connection 20. The protons recombine with the electrons at the first catalytic electrode layer 12 to form hydrogen. In accordance with one embodiment of the present technique, the electrons are flowed through an electrical device (not shown) to generate power for driving any electrical or electromechanical device, prior to recombination of the electrons with the protons at the first catalytic surface 12 to form hydrogen. Therefore the hybrid capacitive storage system 2 can reversibly store electrical energy and chemical energy in the form of hydrogen. The capacitive hybrid storage systems disclosed herein may work with either gaseous or liquid hydrogen.

The dielectric layer 16 comprises a non-conducting material that is substantially impermeable to hydrogen, electrons and protons. The capacitive hybrid storage system 2 works most efficiently when the dielectric layer 16 does not allow the molecular hydrogen, the atomic hydrogen, electrons and the protons to diffuse through the dielectric layer 16. A dielectric material is defined as substantially impermeable to hydrogen when 0.2 ppm/sec and preferable 0.1 ppm/sec of the stored hydrogen is allowed to diffuse through the dielectric layer. Once the electrons are accumulated on the second surface 22 of the dielectric layer 16 and the protons remain in the first surface 18 of the dielectric layer 16, the electrons will have a tendency to recombine with the protons by diffusing through the dielectric layer 16. If the dielectric layer 16 is permeable to either proton or electron, some amount of charge is lost from the hybrid capacitive storage system 2 and hydrogen may get released in an uncontrolled manner. Another important property of the dielectric material to work effectively in the hybrid capacitive storage system is the material's dielectric constant. The capacity of the dielectric material to store electrical charge is higher when the dielectric constant of the dielectric material is high. In some embodiments, the dielectric constant of the dielectric material forming the dielectric layer 16 is preferably over 100. In some other embodiments, the dielectric constant of the material forming the dielectric layer 16 is over 1000. In some embodiments, the dielectric material forming the dielectric layer 16 comprises at least one of a ferroelectric, a piezoelectric, a ceramic, a nonmetal or an organic material. In some other embodiments, the dielectric material is selected from the group consisting of ABO3 perovskite compounds, such as, titanates, niboates and zirconates. The titanates include, but not limited to strontium titanate and barium titanate. In some embodiments, the dielectric material is modified by adding metals, such as, [GGR1]lead, magnesium, and strontium.

The first catalytic electrode layer 12 comprises a material, such as, for example, Palladium (Pd) or Platinum (Pt) that catalytically dissociates molecular hydrogen ($H_2$) into atomic hydrogen ($H_a$). Other transition elements, such as Nickel (Ni), Scandium (Sc), Titanium (Ti), and Vanadium (V) may also be used as the material for the first catalyst electrode layer 12. Catalytic alloys, such as palladium silver and palladium nickel alloys, and platinum alloys may also be used to catalytically dissociate hydrogen molecule. Other elements including Magnesium (Mg) may also be used to catalytically dissociate molecular hydrogen. Once the electric field 26 is applied and the atomic hydrogen 14 dissociates into protonic hydrogen and electron, the protonic hydrogen diffuses into the first catalytic electrode layer 12 and aligns itself at the first surface 18 of the dielectric material 16. In this process a proton interface is built between the first surface of the dielectric layer 18 and the first catalytic electrode layer 12. The electrons are stored at the second electrode 24 after flowing through the electrical connection 20. Once the field is taken off, and the electrical connection is open, the electrical energy and the chemical energy in the form of hydrogen is stored in the hybrid capacitive storage system 2 disclosed herein. Once the hydrogen is required to be released, the electrical connection 20 is reestablished. Some external electronics (not shown) may be needed to control the flow of electrons for a controlled release of the hydrogen from the capacitive hybrid storage system 2 in conjunction with an applied field.

In some embodiments, the field 26 is continuously applied to store hydrogen and electrical energy in the hybrid capacitive storage system. In order to control the discharge of hydrogen and electrical energy from the hybrid capacitive storage systems, the applied field may be reduced and the reduction of field starts the discharge process of the hydrogen in a controlled fashion. In some other embodiments, the hybrid capacitive storage systems disclosed herein are charged with hydrogen at one location. Once the hybrid capacitive storage system is charged, the electrical connection is opened and the field is taken off to keep the stored hydrogen and electrical energy intact. This charged hybrid capacitive storage system may be taken to a second remote location where the electrical connection of the storage system is reestablished to release the hydrogen and electrical energy stored in the charged hybrid capacitive storage system. In order to control the release of hydrogen and electrical energy in the second location, in some other embodiments, the same field is applied to the hybrid capacitive storage system and the electrical connection is reestablished. Once the same field is applied to the hybrid capacitive storage system and the electrical connection is reestablished at the second location, the hybrid capacitive storage can operate in the controlling mode for releasing hydrogen and electrical energy. The applied field is then reduced to release the hydrogen and electrical energy in a controlled manner. Therefore application of the electric field 26 acts as a gating mechanism for controlling the uptake and release of hydrogen. The electrical connection between the first catalytic electrode layer 12 and the second electrode layer 24 is configured to have a gate or a switching mechanism (not shown) that can close and open to connect or disconnect the electrical connection 20. When the electrical field 26 is applied and the switch is closed, the atomic hydrogen 14 breaks down into protons and electrons. The electrons flow through the electrical connection to the second electrode 24 whereas the protons diffuse to the first surface of the dielectric layer 18. Subsequently the electrons diffuse through the second electrode layer 24 and align themselves on the second surface 22 of the dielectric layer 16. In some embodiments, the electrical field 26 applied in the hybrid capacitive storage system 2 includes but is not limited to a direct current voltage source.

In one embodiment in accordance with the present technique, the first catalytic electrode layer comprises a first catalytic layer and a first electrode layer. The first electrode layer and the second electrode layer comprise a material that is electrically conductive and is selected from a group consisting of Copper (Cu), Nickel (Ni), Silver (Ag), Palladium (Pd) and Platinum (Pt). In some embodiments, as shown in FIG. 1, the catalytic electrode layer also acts as the first electrode layer.

Figure 2:
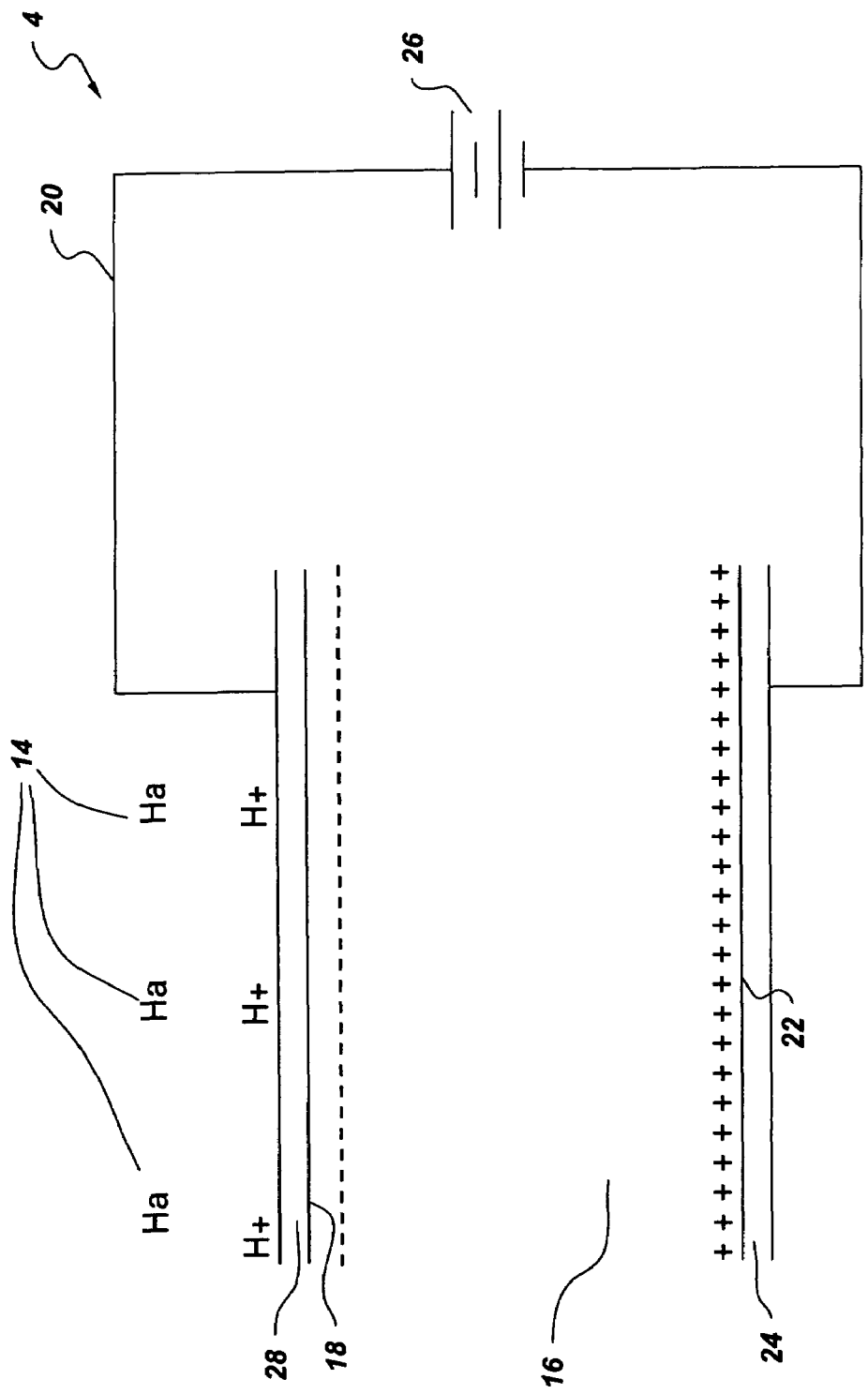
FIG. 2 is a diagram of another exemplary embodiment of a hybrid capacitive storage system showing the storage of protons and electrons.

FIG. 2 illustrates an exemplary embodiment of a hybrid capacitive storage system 4 in which like features are designated with like reference numerals. The hybrid capacitive storage system 4 comprises a first electrode layer 28, a first dielectric layer 16 and a second electrode layer 24. Atomic hydrogen 14 is introduced directly into the hybrid capacitive storage system 4. The capacitive hybrid storage 4 further comprises a field 26 that may be applied between the first electrode layer 28 and the second electrode layer 24. Under the influence of the electrical field 26 the atomic hydrogen 14 is ionized, thereby forming protons and electrons. The protons are hydrogen nuclei that migrate to the first surface 18 of the dielectric layer 16. The electrons are transported through the electrical connection 20 to the surface of the second electrode layer 24.

Once the electrical connection is open and the field is taken off, the electrical energy and the chemical energy in form of hydrogen are stored in the hybrid capacitive storage 4. When the stored hydrogen is to be released, the electrical connection 20 is reestablished. The protons recombine with electrons at the first electrode layer 28 to form atomic hydrogen. In one embodiment the electrons are flowed through an electrical device (not shown) to generate power prior to recombination with protons at the first electrode layer 28 to form hydrogen. Therefore, the hybrid capacitive storage system 4 can store and release electrical energy and chemical energy in the form of hydrogen.

Figure 3:
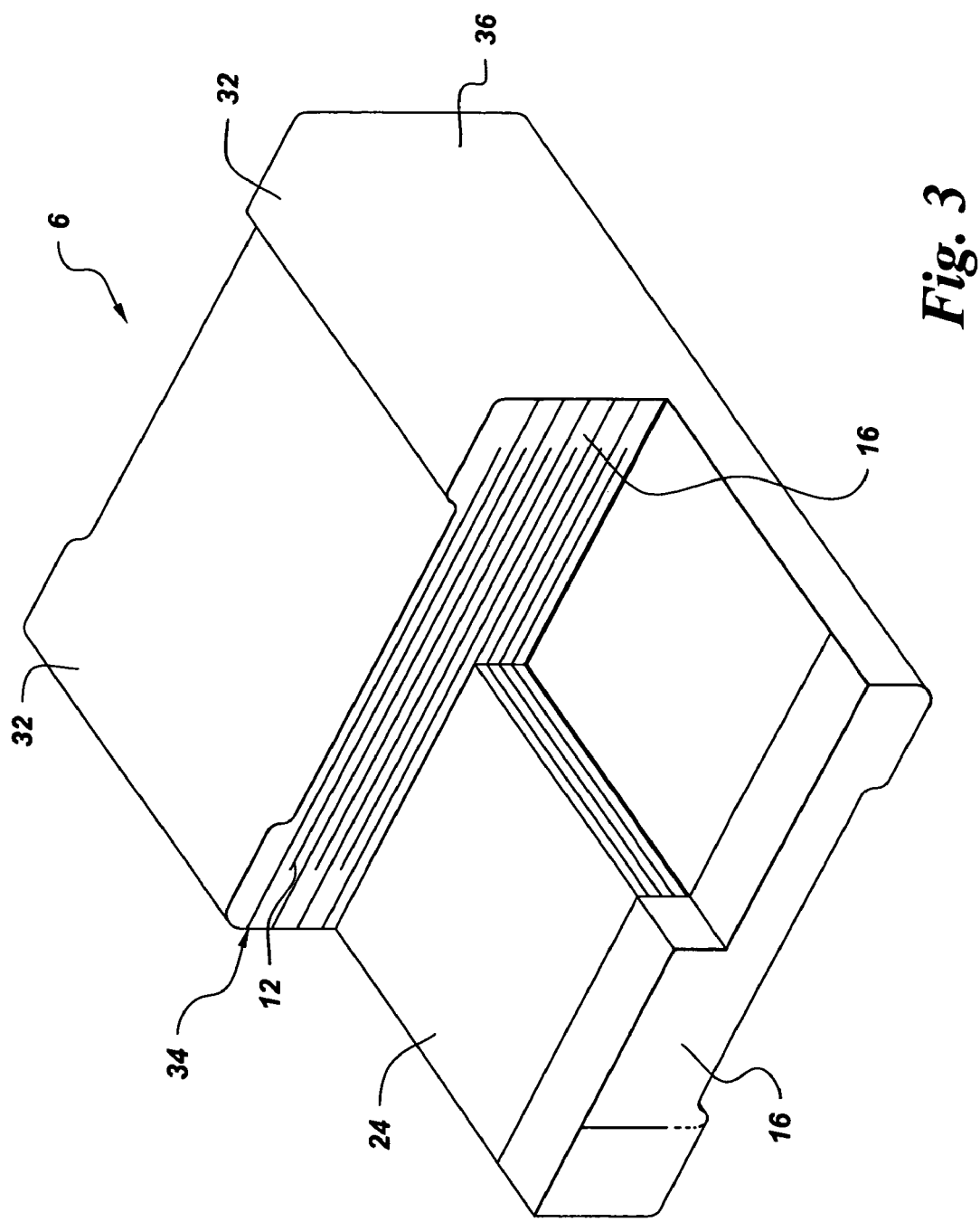
FIG. 3 is a perspective view of an exemplary embodiment of a hybrid capacitive storage system comprising a multilayer stack.

In one embodiment in accordance with the present technique a multi-layer hybrid capacitive storage system 6 is disclosed as illustrated in FIG. 3 in which like features are designated with like reference numerals. The multi-layer hybrid capacitive storage system 6 comprises a plurality of individual capacitive storage layers arranged in a stack. Each layer comprises a first catalytic electrode layer 12, a first dielectric layer 16, and a second electrode layer 24. The multi-layer stack 6 comprises two surfaces, a first surface 34 and a second surface 36 on either side of the multilayer stack 6. The alternating electrodes are layers in the multi-layer stack in such a way that alternating electrodes are either connected to the first surface 34 or the second surface 36. The surfaces 32 on the top of the multi-layer stack 6 are the termination junctions that are configured to be connected to an electrical connection for applying a field (not shown). The catalytic electrode layers 12 are in intimate contact with the first surface 34 of the multi-layer stack 6. The second electrode layers 24 are in intimate contact with the second surface 36 of the multi-layer stack. The dielectric material layer 16 is layered in between each catalytic electrode layer 12 and second electrode layer 24. Once an electrical field (not shown) is applied across the termination junctions 32, each alternating pair of electrode layers is positively and negatively charged.

The multi-layer stack 6 may be charged by immersing the multi-layer stack 6 in a vessel containing hydrogen or compounds which generate hydrogen and applying an electric field across the termination junctions 32. When the stack is immersed in a vessel containing hydrogen or compounds, which compounds generate hydrogen, molecular hydrogen comes in contact with the catalytic electrode layers 12 and is converted to atomic hydrogen. The atomic hydrogen diffuses through the catalytic electrode layers 12. The configuration of the stack is to be optimized so that hydrogen can easily diffuse through the catalytic electrode layers 12. In one embodiment, the multilayer stack 6 may be charged by immersing the multilayer stack 6 into a pressurized vessel containing liquid or gaseous hydrogen or compounds, which compounds generate hydrogen. Once the molecular hydrogen is stored the pressure of the vessel decreases as at least a portion of hydrogen is stored in the multilayer stack. Once the release of the hydrogen is desired, a vessel containing the charged multiplayer stack may be attached to a delivery line comprising a valve to control the release of hydrogen from the vessel. The storage capacity of the multi-layer stack in terms of chemical and electrical energy linearly increases with the number of layers and also with the surface area of each layer. In one embodiment in accordance with the present technique, the thickness of each layer in the multi-layer stack is up to about 100 microns ($\mu$m). It is advantageous to have thin individual layers of the dielectric material acting as individual hybrid capacitive storage systems in a multilayer hybrid capacitive storage. For a given dielectric material, advantageously, the multilayer stack can operate at a lower operating voltage when the layers are very thin. The second advantage of having thin individual layers in a multilayer stack is the availability of increased surface area for storage.

The manufacturing of the multiplayer stack may be completed by tape casting the dielectric material, which is cured at a high temperature. The preparation of tape cast multilayer systems is well know in the art and can be processed by any person skilled in the art of ceramic processing.

The disclosed method for storing electrical energy and hydrogen in a hybrid capacitive storage system comprises several steps. Molecular hydrogen is introduced to at least a first dielectric layer, which dielectric layer is substantially impermeable to hydrogen. Molecular hydrogen is converted into atomic hydrogen using at least a first catalytic electrode layer disposed on at least a portion of a first surface of said first dielectric layer. The first catalytic electrode layer is connected to an electrode layer disposed on at least a portion of a second surface of said first dielectric layer to build an electrical connection. An electrical field is selectively applied to the storage system using at least one field generator. When the hydrogen is introduced to the storage system and the field generator is activated, the atomic hydrogen is converted to protons and electrons. The electrons are permitted to flow through electrical connection to the second electrode layer and the protons remain at said first catalytic electrode layer. The method in accordance with the present technique further comprises recombination of the electrons with the protons, wherein the electrons are permitted to flow back through the electrical connection to the first catalytic electrode layer for recombination with the protons to form hydrogen. The electrons while flowing back from the second electrode layer may be routed through an electrical device to generate power prior to the recombination with said protons.

The hybrid capacitive storage systems described herein may be used for a variety of applications, such as for fuel cell and vehicles. Advantageously, the hybrid capacitive storage systems disclosed herein shows potential for being used in various other non-limiting commercial, industrial and consumer application uses such as, cell phones, computers, and PDA. Since the disclosed hybrid capacitive storage systems can store chemical and electrical energy, it may be used in mobile application in a vehicle in conjunction with fuel cells, wherein the hydrogen fuel for the fuel cell is supplied by the hybrid capacitive storage system disclosed herein.

The hybrid capacitive storage systems disclosed herein have several advantages. The conventional hydrogen storage systems using solid storage materials require elevated pressure and temperature for adsorption and desorption of hydrogen. In a hydrogen storage system where solid materials like metal hydrides are used for hydrogen storage, hydrogen is adsorbed at lower temperature and is desorbed at higher temperature to complete a full cycle. During this full cycle, phase transformation takes place inside the solid storage material in order to store and release hydrogen. This results in degradation of the storage material and each storage material can withstand a maximum number of cycles before the material disintegrates. In the disclosed hybrid capacitive storage systems, since there is no phase transformation of the storage material during storing and releasing hydrogen, the life of the storage system is not limited by any number of storing and releasing cycle. Further more external electronics and a gating mechanism can control the electron flow that subsequently controls the release of hydrogen. Furthermore the disclosed hybrid storage system can simultaneously store electrical energy, which electrical energy may be used to drive any electrical or electromechanical devices in conjunction with producing hydrogen.

While the invention has been described in terms of various specific embodiments, those skilled in the art will recognize that the invention can be practiced with modification within the spirit and scope of the claims.

The invention claimed is:

1. A hybrid capacitive storage system for storing electrical energy and hydrogen comprising:
   at least a first dielectric layer, which dielectric layer is substantially impermeable to hydrogen;
   at least a first catalytic electrode layer disposed on at least a portion of a first surface of said first dielectric layer, which first catalytic electrode layer converts molecular hydrogen into atomic hydrogen;
   an electrode layer disposed on at least a portion of a second surface of said first dielectric layer, which electrode layer is selectively electrically connected to said first catalytic electrode layer; and
   at least one field generator for selectively applying a field to said storage system, wherein upon introduction of hydrogen to said storage system and activation of said at least one field generator, said hydrogen is converted to protons and electrons;
   wherein said electrons are permitted to flow through electrical connection to said electrode layer and said protons remain at said first catalytic electrode layer.

2. The hybrid capacitive storage system in accordance with claim 1, wherein said electrons are permitted to flow back through said electrical connection to said first catalytic electrode layer for recombination with said protons to form hydrogen.

3. The hybrid capacitive storage system in accordance with claim 2, wherein said recombination is controlled by applying an external field.

4. The hybrid capacitive storage system in accordance with claim 2, further comprising an electrical device, wherein said electrons are flowed through said electrical device to generate power prior to recombination with said protons.

5. The hybrid capacitive storage system in accordance with claim 2, wherein the hydrogen produced by said recombination is used as a fuel in a fuel cell.

6. The hybrid capacitive storage system in accordance with claim 1, wherein said first dielectric layer comprises a material having a dielectric constant over 100.

7. The hybrid capacitive storage system in accordance with claim 1, wherein said first dielectric layer comprises a material having a dielectric constant over 1000.

8. The hybrid capacitive storage system in accordance with claim 1, wherein said first dielectric layer comprises a ferroelectric material selected from the group consisting of titanates, niboates and zirconates.

9. The hybrid capacitive storage system in accordance with claim 1, wherein said first dielectric layer comprises a material having a hydrogen permeability of less than about 0.2 ppm/sec of stored hydrogen.

10. The hybrid capacitive storage system in accordance with claim 1, wherein said first dielectric layer comprises a material having a hydrogen permeability of less than about 0.1 ppm/sec of stored hydrogen.

11. The hybrid capacitive storage system in accordance with claim 1, wherein said first catalytic electrode layer comprises a catalytic layer disposed on an electrode layer.

12. The hybrid capacitive storage system in accordance with claim 11, wherein said electrode layer comprises a material that is electrically conductive and said catalytic layer comprises a material that converts hydrogen into atomic hydrogen.

13. The hybrid capacitive storage system in accordance with claim 1, wherein said electrode layer comprises a material selected from the group consisting of Copper, Nickel, Silver, Palladium and Platinum.

14. The hybrid capacitive storage system according to claim 1, wherein said catalytic layer comprises a material selected from the group consisting of Palladium, Platinum, Nickel, Scandium, Titanium and Vanadium.

15. The hybrid capacitive storage system in accordance with claim 1, wherein said first catalytic electrode layer comprises a material that is electrically conductive and converts hydrogen into atomic hydrogen.

16. The hybrid capacitive storage system in accordance with claim 1, wherein said field generator comprises a direct current voltage source.

17. A hybrid capacitive reversible storage system for storing electrical energy and hydrogen comprising:
   at least a first dielectric layer, which dielectric layer is substantially impermeable to hydrogen;
   at least a first catalytic electrode layer disposed on at least a portion of a first surface of said first dielectric layer, which first catalytic electrode layer converts molecular hydrogen into atomic hydrogen;
   an electrode layer disposed on at least a portion of a second surface of said first dielectric layer, which electrode layer is selectively electrically connected to said first catalytic electrode layer; and
      at least one field generator for selectively applying a field to said storage system, wherein upon introduction of hydrogen to said storage system and activation of said at least one field generator, said hydrogen is converted to protons and electrons;
   wherein said electrons are permitted to flow through electrical connection to said electrode layer and said protons remain at said first catalytic electrode layer.

18. A method for storing electrical energy and hydrogen comprising:
   introducing molecular hydrogen to at least a first dielectric layer, which dielectric layer is substantially impermeable to hydrogen;
   converting molecular hydrogen into atomic hydrogen; and
   selectively applying a field to convert the atomic hydrogen into protons and electrons.

19. The method in accordance with claim 18, wherein at least a first catalytic electrode layer is disposed on at least a portion of a first surface of said first dielectric layer.

20. The method in accordance with claim 19 further comprising electrically connecting said first catalytic electrode layer to an electrode layer disposed on at least a portion of a second surface of said first dielectric layer to build an electrical connection.

21. The method in accordance with claim 20, wherein said electrons are permitted to flow through said electrical connection to said electrode layer and said protons remain at said first catalytic electrode layer.

22. The method in accordance with claim 21 further comprising recombination of said electrons with said protons, wherein said electrons are permitted to flow back through said electrical connection to said first catalytic electrode layer for said recombination with said protons to form hydrogen.

23. The method in accordance with claim 18, wherein the field is applied using a field generator.

24. The method in accordance with claim 18 further comprising generating power by flowing said electrons through an electrical device prior to said recombination with said protons.

25. A method for storing electrical energy and hydrogen comprising:
   introducing molecular hydrogen to at least a first dielectric layer, which dielectric layer is substantially impermeable to hydrogen;
   converting molecular hydrogen into atomic hydrogen using at least a first catalytic electrode layer disposed on at least a portion of a first surface of said first dielectric layer;
   electrically connecting said first catalytic electrode layer to an electrode layer disposed on at least a portion of a second surface of said first dielectric layer to build an electrical connection;
   selectively applying a field to said storage system using at least one field generator, wherein upon introduction of hydrogen to said storage system and activation of said at least one field generator, said to convert the atomic hydrogen to protons and electrons;
   wherein said electrons are permitted to flow through electrical connection to said electrode layer and said protons remain at said first catalytic electrode layer.

26. A hybrid capacitive storage stack comprising a plurality of hybrid capacitive storage systems for storing electrical energy and hydrogen, said hybrid capacitive storage systems comprising:
   at least a first dielectric layer, which dielectric layer is substantially impermeable to hydrogen;
   at least a first catalytic electrode layer disposed on at least a portion of a first surface of said first dielectric layer, which first catalytic electrode layer converts molecular hydrogen into atomic hydrogen;
   an electrode layer disposed on at least a portion of a second surface of said first dielectric layer, which electrode layer is selectively electrically connected to said first catalytic electrode layer; and
   at least one field generator for selectively applying a field to said storage system, wherein upon introduction of hydrogen to said storage system and activation of said at least one field generator, said hydrogen is converted to protons and electrons;
   wherein said electrons are permitted to flow through electrical connection to said electrode layer and said protons remain at said first catalytic electrode layer.

* * * * *

UNITED STATES PATENT AND TRADEMARK OFFICE
CERTIFICATE OF CORRECTION

PATENT NO. : 7,576,970 B2
APPLICATION NO. : 10/745354
DATED : August 18, 2009
INVENTOR(S) : Minnear et al.

It is certified that error appears in the above-identified patent and that said Letters Patent is hereby corrected as shown below:

On the Face Page, in Field (57), under "ABSTRACT", delete "A hybrid capacitive storage system and method for storing electrical energy and hydrogen comprising at least a first dielectric layer, which dielectric layer is substantially impermeable to hydrogen. The hybrid storage system further comprises at least a first catalytic electrode layer disposed on at least a portion of a first surface of said first dielectric layer, which first catalytic electrode layer converts molecular hydrogen into atomic hydrogen, an electrode layer disposed on at least a portion of a second surface of said first dielectric layer, which electrode layer is selectively electrically connected to said first catalytic electrode layer; and at least one field generator for selectively applying a field to said storage system. Upon introduction of hydrogen to the storage system and activation of the at least one field generator, the hydrogen is converted to protons and electrons, wherein the electrons are permitted to flow through electrical connection to the electrode layer and the protons remain at the first catalytic electrode layer" and insert -- A hybrid capacitive storage system and method for storing electrical energy and hydrogen is provided. The hybrid storage system includes at least a first dielectric layer substantially impermeable to hydrogen. The hybrid storage system further includes at least a first catalytic electrode layer disposed on at least a portion of a first surface of said first dielectric layer, an electrode layer disposed on at least a portion of a second surface of said first dielectric layer, and at least one field generator for selectively applying a field to said storage system. The first catalytic electrode layer converts molecular hydrogen into atomic hydrogen and the electrode layer is selectively electrically connected to said first catalytic electrode layer. Upon introduction of hydrogen to the storage system and activation of the at least one field generator, the hydrogen is converted to protons and electrons, wherein the electrons are permitted to flow through electrical connection to the electrode layer and the protons remain at the first catalytic electrode layer --, therefor.

Signed and Sealed this

Twenty-second Day of December, 2009

David J. Kappos
*Director of the United States Patent and Trademark Office*